Figure 1:
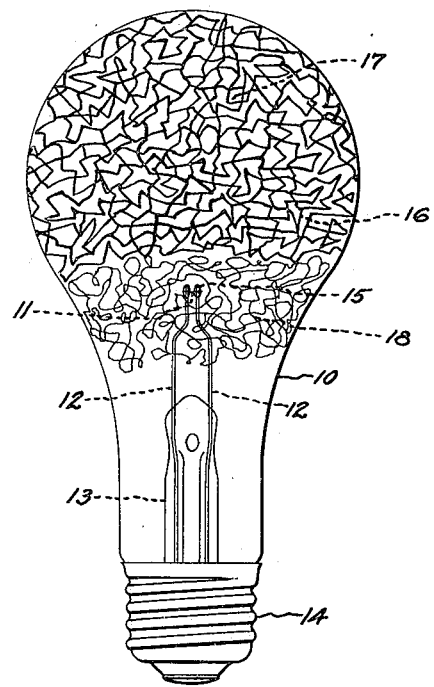

Nov. 9, 1943. J. H. ORAM 2,334,155

FLASH LAMP

Filed July 22, 1939

Inventor:
John H. Oram,
by Harry E. Dunham
His Attorney.

Patented Nov. 9, 1943

2,334,155

UNITED STATES PATENT OFFICE 2,334,155

FLASH LAMP

John H. Oram, Cleveland Heights, Ohio, assignor to General Electric Company, a corporation of New York Application July 22, 1939, Serial No. 285,980

16 Claims. (Cl. 67—31)

My invention relates to flash lamps in general, and more particularly to that type of flash lamp used for photographic purposes. Such flash lamps usually comprise a sealed transparent envelope in which is enclosed a readily combustible material such as metal wire and/or foil, together with suitable ignition means therefor, and a substance, usually a gas filling, which, upon ignition of the lamp, enters into a reaction with the combustible material with the resulting emission of actinic light. Still more particularly, my invention relates to the combustible material employed in such flash lamps.

At present, the combustible material generally employed in flash lamps consists either of a quantity of extremely thin metallic foil of substantially uniform thickness or a quantity of extremely fine metallic wire or ribbon of substantially uniform diameter or cross-sectional area. All portions of such combustible material consequently have substantially the same rate of combustion.

While flash lamps containing wire as the combustible medium have been proposed heretofore for synchronized flashlight photography, still they do not operate as well as might be expected with cameras equipped with shutters of the focal plane type. The reason for this is that the duration of the high intensity portion of the flash is still insufficient to insure that all portions of the sensitized film traversed by the shutter slit will, in almost all cases, be exposed to substantially the same degree of light intensity. Thus, even though the camera shutter is operated at the peak of the flash, various portions of the sensitized film are apt to be exposed to a different degree of light intensity, resulting in inferior pictures.

In order to obtain, from wire flash lamps, a flash of light of sufficient intensity for satisfactory photographic pictures, the rate of combustion of the wire had to be speeded up by reducing the wire to extremely fine size. However, this increase in the rate of combustion was effected at the expense of the flash duration, which was more or less proportionately diminished to the point where the flash became too short for satisfactory use with cameras having focal plane shutters. Obviously, the desirable flash lamp for use with such cameras was one which would quickly generate light of relatively high and substantially uniform intensity and then maintain that high intensity for an exceptionally long period of time. Specifically, such a flash lamp should produce a flash of light of such characteristics that, at one-half its peak intensity, at least 500,000 lumens of light are generated over a time interval of at least 30 milliseconds and preferably around 60 milliseconds. Such a prolonged duration for the high intensity portion of the light flash, together with its substantial uniformity, practically assures that all portions of the sensitized film will be exposed in almost all cases to a sufficiently high and substantially uniform degree of illumination even though the camera shutter and light flash be not precisely synchronized.

One object of my invention is to provide a flash lamp of especial utility in connection with cameras equipped with focal plane shutters.

Another object of my invention is to provide a flash lamp which will emit a relatively high degree of light for a prolonged period of time.

Still another object of my invention is to provide a flash lamp which will emit a flash of light characterized by a rapid rise from zero to a broadened peak of high and substantially uniform intensity and of prolonged duration.

A further object of my invention is to provide a flash lamp which will emit a flash of light of such characteristics that at one-half of its peak intensity, at least 500,000 lumens of light are generated over a period of at least 30 milliseconds.

A still further object of my invention is to provide a flash lamp containing combustible light-giving material of such ignition properties and so arranged as to quickly produce an exceptionally prolonged concentrated flash of light.

A feature of my invention is the provision within a flash lamp of loosely arranged combustible material consisting partly of relatively heavy combustible wire having a relatively slow rate of combustion and partly of relatively fine combustible wire having a relatively high rate of combustion, the two different types of wire being so arranged that the finer wire serves to facilitate the ignition of the heavier wire and the two combine to produce a flash of light of relatively high and uniform intensity and continuing for a relatively long period of time so as to be particularly suited for use with cameras of the focal plane shutter type. A further feature of my invention is in the provision of means within the lamp for securing the heavier wire in place within the lamp bulb so as to prevent the same from displacing the finer and lighter wire within the bulb and thus altering the light-giving characteristics of the lamp from those desired.

Figure 2:
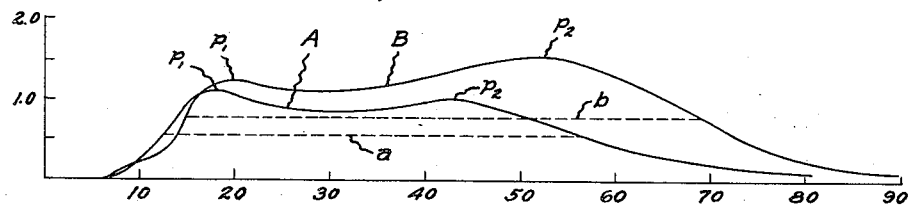

Further objects and advantages of my invention will appear from the following description of a species thereof and from the accompanying drawing in which:

Fig. 1 is an elevation of a flash lamp comprising my invention in which the combustible material consists of a loosely arranged mass of relatively fine, combustible wire centrally disposed within the lower portion of the bulb and surrounding the ignition means therein, and a quantity of loosely arranged, relatively heavy, combustible wire disposed within the upper portion of said bulb; and Fig. 2 is a chart showing the light curves produced by two different types of lamps constructed in accordance with my invention and containing a combination of relatively heavy and fine combustible wire.

Referring to Fig. 1, the flash lamp there shown comprises a vitreous, transparent envelope or bulb 10 containing a small filament 11, the ends of which are connected to leading-in wires 12, 12 which extend through a stem 13 to a base 14. The filament 11 and adjacent portions of the leading-in wires 12, 12 are coated with a layer of a suitable fulminating substance 15 to thereby form the primer or ignition means for the lamp. The fulminating material is preferably of the type disclosed and claimed in co-pending United States patent application Serial No. 278,288, filed June 9, 1939, by George H. Meridith and assigned to the assignee of the present application. The fulminating substance therein disclosed is composed of a mixture of magnesium and zirconium metal powders and potassium perchlorate powder bonded together by a suitable binder such as nitro-cellulose. The bulb is coated on its inner or outer surface, preferably on both surfaces, with a coating of a suitable transparent varnish or lacquer to thereby prevent cracking of the bulb on charge flashing and to render the bulb substantially shatterproof, as disclosed and claimed in co-pending application Serial No. 269,197, H. D. Blake, filed April 21, 1939. A quantity of loosely arranged combustible material 16 is disposed within the bulb 10 so as to occupy the space within the bulbous portion of said bulb and surround the ignition filament 11 therein. The bulb also contains a filling of oxygen or oxygen-containing gas at a suitable pressure for supporting the combustion of the combustible material 16. The pressure of this gaseous filling will vary depending upon the type of gas employed, the size of the bulb, and the quantity and type of combustible material therein. For bulb sizes commonly in use at present, and with oxygen being used as the combustion-supporting gas and pure aluminum as the combustible material, the pressure of the gaseous filling will vary up to 500 mm. of mercury or even close to one atmosphere.

The combustible material 16 according to my invention consists of a combination of combustible wires and/or ribbons having different rates of combustion, the said wires or ribbons being arranged in definite relation with respect to one another and with respect to the lamp ignition means 11 so as to provide, upon ignition, a flash of light having the desired characteristics. In the preferred embodiment of the invention, the combustible material 16 consists of a combination of two different types of combustible wire, preferably aluminum, having different wire sizes and therefore different rates of combustion. The heavier wire 17 preferably consists of regular die drawn pure aluminum wire having a diameter of approximately 1.5 mils or thereabouts and preferably crimped in any suitable manner. As shown in the drawing, this relatively heavy wire 17 is disposed within the upper portion of the bulb 10, away from the lamp ignition means 11. The finer wire 18 preferably consists of copper-drawn pure aluminum wire having a weight of approximately 1.1 milligrams per meter or close thereto, and is centrally disposed within the lower section of the bulb so as to enclose or surround the lamp ignition means 11. The said finer wire 18 is thus disposed immediately adjacent to the lower side of the quantity of heavier wire 17. By "copper-drawn aluminum wire" is meant an aluminum wire provided with a copper sleeve or jacket, the composite wire being drawn down to a fine size after which the copper sleeve or coating is removed, preferably by dissolving with a suitable acid.

To provide a light flash having the desired characteristics referred to hereinabove, the respective amounts of the relatively heavy and fine aluminum wire must necessarily be kept within certain proportions. Thus, the proportions by weight of the heavy and the fine wire should be within the following approximate range:

|  | Per cent |
| --- | --- |
| Heavy wire | 60–85 |
| Fine wire | 40–15 |

The preferred proportions by weight, however, of the heavy and the fine wire are approximately 71.5 per cent and 28.5 per cent respectively. Thus, as a specific example, the combustible material in a flash lamp employing a bulb commercially designated as an A17—A7 (approximately pear-shaped) bulb is composed, according to the invention, of approximately 50 milligrams of the crimped or crinkled 1.5 mil regular die-drawn pure aluminum wire and approximately 20 milligrams of the copper-drawn 1.1 milligram/meter pure aluminum wire. The oxygen gas filling pressure for such a lamp preferably amounts to approximately 500 mm. of mercury. Such a lamp is of particular utility in connection with the smaller sized cameras such as those taking 2¼ inch by 3¼ inch and smaller pictures. Likewise, for a larger flash lamp employing an A21—G2 (also pear-shaped) bulb, the combustible material is composed of approximately 100 milligrams of the relatively heavy (1.5 mil) aluminum wire and approximately 40 milligrams of the relatively fine (1.1 milligram/meter) aluminum wire. The oxygen gas filling pressure in this latter type of lamp preferably amounts to approximately 400 mm. of mercury. Such a lamp, because of its greater light output, is especially suited for use in connection with the larger sized cameras in use at present, such as those taking 3¼ inch by 4¼ inch, 4 inch by 5 inch and larger pictures.

The particular disposition of the relatively heavy and fine wire within the lamp bulb, as described hereinabove, is essential in order to obtain therefrom a flash of light having the desired characteristics, i. e., a relatively high intensity of at least 500,000 lumens spread over a prolonged period of at least 30 milliseconds. The location of the fine wire 18 immediately adjacent the lamp ignition means 11 assures the quick starting of the light flash, due to the relatively high rate of combustion of such fine wire. In addition, the rapid combustion of the fine wire also serves to accelerate the ignition of the heavy and relatively slow burning wire 17.

The light flashes produced by representative lamps according to the preferred form of my invention, are illustrated by the curves shown in Fig. 2. Thus, curve A represents the light flash produced by the smaller type of lamp disclosed hereinbefore in which 50 milligrams of the heavy and 20 milligrams of the fine aluminum wire are employed, while curve B represents the light flash produced by the larger type of lamp employing 100 milligrams of the heavy and 40 milligrams of the fine aluminum wire. The curves clearly indicate that, upon ignition of the lamp, the light intensity reaches its initial peak $p_1$ in 18 to 20 milliseconds following the closure of the electrical circuit through the lamp ignition means 11, thus complying with the requirements for satisfactory operation with synchronizing mechanisms now in use. As before stated, this relatively quick starting of the flash is due to the relatively fast-burning fine wire 18, which accordingly produces the greater portion of the initial volume of actinic light generated. By the time the light produced by the fine wire 18 begins to taper off, the combustion of the relatively heavy wire 17, due to the accelerating effect exerted thereon by the combustion of the fine wire 18, has progressed sufficiently to thereafter compensate for the tapering off of the light from the nearly consumed fine wire 18. Because of this overlapping effect of the light produced by the combustion of the fine and the heavy wire, there is very little, if any, decrease or falling off in the total intensity of the light produced during the time interval between the peak $p_1$ of the fine wire and the peak $p_2$ of the heavy wire. The relatively slow rate of combustion of the heavy wire thereafter serves to produce the light at the end of the flash, as represented by the prolonged downwardly tapering end portion of the curve. The substantially uniform plateau of the curves, indicating substantially uniform light intensity, is a result of the particular proportions and arrangement of the heavy and the fine aluminum wire within the bulb, as specified hereinbefore.

The curves shown in Fig. 2 further disclose that flash lamps according to the invention are adequately capable of producing light flashes meeting the minimum requirements, as set forth hereinabove, for satisfactory operation with cameras having focal plane shutters, i. e., a flash of light which, at one-half its peak intensity, amounts to at least 500,000 lumens over a period of at least 30 milliseconds. Thus, the line $a$, representing one-half the intensity of the light at the highest peak ($p_1$) of curve A, indicates that at least approximately 550,000 lumens of light are produced over a period of approximately 43 milliseconds, extending from approximately 13 to 56 milliseconds, following energization of the lamp ignition means 11. Likewise the line $b$, representing one-half the intensity of the light at the highest peak ($p_2$) of curve B, indicates that at least approximately 800,000 lumens of light are produced over a period of approximately 54 milliseconds, extending from approximately 15 to 69 milliseconds, following energization of the lamp ignition means. Flash lamps producing such a relatively large volume of actinic light for such an exceptionally prolonged period of time have heretofore been unknown.

As before stated, the particular disposition of the relatively heavy and fine aluminum wire 17 and 18, respectively, within the lamp bulb 10 according to the invention, is essential in order to produce the desired flash of light. However, because of the greater weight of the heavier wire 17, the said wire, under the influence of shock and vibrations to which the lamp is apt to be subjected, tends to displace the fine wire 18 from its position within the lower portion of the bulb and immediately surrounding the lamp ignition means 11 to a position more or less to the side of the bulb. Obviously, such a displacement would materially alter the flash characteristics of the lamp. Therefore, to prevent such a displacement of the fine wire, I have found it advisable to positively secure the heavier wire 17 in place within the bulb. This is preferably accomplished, according to the invention, by applying an additional lacquer coating, such as cellulose acetate, to the interior of the bulb immediately prior to the insertion of the combustible wire filling therein, and inserting the said wire filling while the said additional coating is still in a soft and tacky state. Obviously, the nodes of the heavy crimped wire 17, which is first inserted into the bulb, contact the soft coating at a plurality of points so that the wire becomes stuck at such points to the bulb wall upon hardening of the coating. This feature may also be employed, of course, where all the wire in the lamp is of the same type and size, particularly where the wire is not internally strained or is of a more or less soft character having little or no mechanical strength or springiness, such as the copper-drawn wire referred to above. The attachment of the wire to the inner wall of the bulb effectively maintains the uniform spacing or distribution of the wire throughout the bulb, and so insures uniform flash lamp characteristics.

From the foregoing disclosure, it will be seen that my combination heavy and fine aluminum wire flash lamp provides a source of illumination of the character of a flash which quickly attains its maximum intensity, i. e., within the desired period of approximately 20 milliseconds following energization of the lamp ignition filament, and which furnishes light of comparatively high intensity over an exceedingly long period of time—much longer than has heretofore been possible. Thus, the operation of a camera shutter during the high intensity light period is greatly facilitated, and the extreme degree of accuracy in synchronization and in the manufacture of uniformly operating lamps, as heretofore required, is not necessary. Moreover, because of the exceedingly long and uniform high-intensity light period of the lamp according to the invention, it is of particular utility in connection with cameras equipped with focal plane shutters, since all portions of the sensitized film traversed by the shutter will be exposed, in practically all cases, to light of substantially the same degree of intensity.

Instead of the regular die drawn relatively heavy aluminum wire 17, an equivalent amount by weight of copper-drawn aluminum wire of approximately the same weight per meter may be employed with as good or even better results. Thus, instead of the 1.5 mil diameter regular die drawn aluminum wire 17 having a unit weight of approximately 3.33 milligrams/meter, a substantially equivalent weight of copper-drawn aluminum wire having a unit weight of approximately 3.8 milligrams/meter or thereabouts may be advantageously employed.

In the appended claims, the expression "filamentary material" is used to describe either the wire or ribbon referred to above.

What I claim as new and desire to secure by Letters Patent of the United States is:

1. A flash lamp comprising a sealed container, a combustion-supporting atmosphere in said container, a quantity of combustible material within said container, and means disposed within said container for igniting said combustible material, said combustible material comprising a quantity of relatively heavy metallic filamentary material having a relatively slow rate of combustion, and a quantity of relatively fine metallic filamentary material having a relatively high rate of combustion, said heavy filamentary material being loosely arranged within a portion of said container, and said fine filamentary material being loosely arranged within another portion of said container immediately adjacent to one side of said heavy filamentary material and immediately surrounding said ignition means.

2. A flash lamp comprising a sealed container, a combustion-supporting atmosphere in said container, and a quantity of combustible material within said container, said combustible material comprising a quantity of loosely arranged aluminum filamentary material having a relatively slow rate of combustion and a quantity of loosely arranged aluminum filamentary material having a relatively high rate of combustion and disposed immediately adjacent to one side of the said material with the slow rate of combustion.

3. A flash lamp comprising a sealed container, a combustion-supporting atmosphere in said container, and a quantity of combustible material within said container, said combustible material consisting of a quantity of relatively heavy aluminum wire having a diameter of approximately 1.5 mils and a quantity of relatively fine aluminum wire having a weight of approximately 1.1 milligrams per meter, both said heavy and fine wire being loosely arranged within said container with the fine wire disposed immediately adjacent to one side of the heavy wire.

4. A flash lamp comprising a sealed container, a combustion-supporting atmosphere in said container, a quantity of combustible material within said container, and means disposed within the lower portion of said container for igniting said combustible material, said combustible material consisting of a quantity of relatively heavy aluminum filamentary material having a diameter of approximately 1.5 mils and a quantity of relatively fine aluminum filamentary material having a weight of approximately 1.1 milligrams per meter, said heavy filamentary material being loosely arranged within the upper portion of said container, and said fine filamentary material being loosely arranged within the lower portion of said container immediately adjacent to the lower side of said heavy filamentary material and immediately surrounding said ignition means.

5. A flash lamp comprising a sealed container, a combustion-supporting atmosphere in said container, and a quantity of combustible material within said container, said combustible material consisting of from 60 to 85 per cent by weight of relatively heavy aluminum wire having a diameter of approximately 1.5 mils and from 40 to 15 per cent by weight of relatively fine aluminum wire having a weight of approximately 1.1 milligrams per meter, both said heavy and fine wire being loosely arranged within said container with the fine wire disposed immediately adjacent to one side of the heavy wire.

6. A flash lamp comprising a sealed container, a combustion-supporting atmosphere in said container, a quantity of combustible material within said container, and means disposed within said container for igniting said combustible material, said combustible material consisting of from 60 to 85 per cent by weight of relatively heavy aluminum wire having a diameter of approximately 1.5 mils and from 40 to 15 per cent by weight of relatively fine aluminum wire having a weight of approximately 1.1 milligrams per meter, said heavy wire being loosely arranged within a portion of said container, and said fine wire being loosely arranged within another portion of said container immediately adjacent to one side of said heavy wire and immediately surrounding said ignition means.

7. A flash lamp comprising a sealed container, a combustion-supporting atmosphere in said container, a quantity of combustible material within said container, and means disposed within said container for igniting said combustible material, said combustible material consisting of approximately 71.5 per cent by weight of relatively heavy aluminum wire having a diameter of approximately 1.5 mils and approximately 28.5 per cent by weight of relatively fine aluminum wire having a weight of approximately 1.1 milligrams per meter, said heavy wire being loosely arranged within a portion of said container, and said fine wire being loosely arranged within another portion of said container immediately adjacent to one side of said heavy wire and immediately surrounding said ignition means.

8. A flash lamp comprising a sealed container, a combustion-supporting atmosphere in said container, a quantity of combustible material within said container, and means disposed within the lower portion of said container for igniting said combustible material, said combustible material comprising a quantity of relatively heavy metallic filamentary material having a relatively slow rate of combustion, and a quantity of relatively fine metallic filamentary material having a relatively high rate of combustion, said heavy filamentary material being loosely arranged within the upper portion of said container and secured at a plurality of points to the walls of said container, and said fine filamentary material being loosely arranged within the lower portion of said container and immediately surrounding said ignition means.

9. A flash lamp comprising a sealed container having a coating of transparent material on its inner surface, a combustion-supporting atmosphere in said container, and a quantity of readily combustible filamentary material loosely arranged within said container and secured by said coating to the wall of said container at a plurality of spaced points.

10. A flash lamp comprising a sealed container, a combustion-supporting atmosphere in said container, a quantity of combustible material in said container, and means disposed in said container for igniting said combustible material, said combustible material comprising a quantity of relatively heavy metallic filamentary material having a relatively slow rate of combustion and a quantity of relatively fine metallic filamentary material having a relatively high rate of combustion, said heavy filamentary material being loosely arranged within a portion of said container and being secured therein against substantial displacement, and said fine filamentary material being loosely arranged within another portion of said container immediately adjacent to one side of said heavy filamentary material and immediately adjacent said ignition means.

11. A flash lamp comprising a sealed container, a combustion-supporting atmosphere in said container, a quantity of combustible material in said container, and means disposed in said container for igniting said combustible material, said combustible material comprising a quantity of relatively heavy metallic filamentary material having a relatively slow rate of combustion and a quantity of relatively fine metallic filamentary material having a relatively high rate of combustion, said heavy filamentary material being loosely arranged within a portion of said container and being secured at a plurality of points to the walls of said container, and said fine filamentary material being loosely arranged within another portion of said container immediately adjacent to one side of said heavy filamentary material and immediately adjacent said ignition means.

12. In a photoflash lamp, a bulb, igniting means in said bulb, combustible material formed into wire of a certain gauge filling the bulb except around the igniting means which is out of the center of the mass of the combustible material, and combustible material formed into wire of a lighter gauge filling said space around the igniting means.

13. In a photoflash lamp, a bulb having a spherical portion and filled with oxygen, igniting means in said bulb, combustible material formed into relatively heay gauge wire filling the spherical portion of said bulb except around the igniting means, and combustible material formed into wire of relatively light gauge filling said space around the igniting means.

14. In a photoflash lamp, a bulb having a spherical portion and filled with oxygen to a pressure of approximately 45 cm. of mercury, igniting means in said bulb, combustible material formed into relatively heavy gauge wire filling the spherical portion of said bulb except around the igniting means, combustible material formed into wire of relatively light gauge filling said space around the igniting means which is out of the center of the mass of combustible material.

15. A flash lamp comprising a bulb containing a combustion-supporting gas, ignition means in said bulb, and combustible material in said bulb comprising metallic filamentary material of two different types having different rates of combustion, the material having the faster combustion rate being loosely arranged in the bulb immediately around the ignition means therein, and the material having the slower combustion rate being loosely arranged in the bulb adjacent the material of faster combustion rate and spaced thereby from said ignition means, said combustible material producing upon ignition, a substantially uniform light intensity above a predetermined minimum level for a prolonged period of time.

16. A flash lamp comprising a bulb containing a combustion-supporting gas, ignition means in said bulb, and combustible material in said bulb comprising metallic filamentary material of two different types having different rates of combustion, the material having the faster combustion rate being loosely arranged within a portion of said bulb immediately surrounding said ignition means, and the material having the slower combustion rate being loosely arranged within another portion of said bulb immediately adjacent one side of the material of faster combustion rate and spaced thereby from said ignition means, said combustible material producing, upon ignition, a substantially uniform light intensity above a predetermined minimum level for a prolonged period of time.

JOHN H. ORAM.